US010643275B2

(12) United States Patent
Joseph (10) Patent No.: US 10,643,275 B2
(45) Date of Patent: *May 5, 2020

(54) METHODS AND SYSTEMS FOR MANAGING CONSUMER SAVINGS WITH CREDIT CARD TRANSACTIONS

(71) Applicant: MASTERCARD INTERNATIONAL INCORPORATED, Purchase, NY (US)

(72) Inventor: Gausper Joseph, Ballwin, MO (US)

(73) Assignee: MASTERCARD INTERNATIONAL INCORPORATED, Purchase, NY (US)

(*) Notice: Subject to any disclaimer, the term of this patent is extended or adjusted under 35 U.S.C. 154(b) by 179 days.

This patent is subject to a terminal disclaimer.

(21) Appl. No.: 15/819,703

(22) Filed: Nov. 21, 2017

(65) Prior Publication Data

US 2018/0096423 A1 Apr. 5, 2018
US 2018/0336627 A9 Nov. 22, 2018

Related U.S. Application Data

(63) Continuation of application No. 14/142,395, filed on Dec. 27, 2013, now Pat. No. 9,824,393.

(51) Int. Cl.
G06Q 40/02 (2012.01)
G06Q 20/10 (2012.01)
G06Q 20/34 (2012.01)
G06Q 30/06 (2012.01)

(52) U.S. Cl.
CPC ............ *G06Q 40/02* (2013.01); *G06Q 20/10* (2013.01); *G06Q 20/34* (2013.01); *G06Q 30/06* (2013.01)

(58) Field of Classification Search
CPC ........ G06Q 40/02; G06Q 20/10; G06Q 20/34; G06Q 30/06
USPC ............................. 705/16, 21, 38, 39, 40, 44
See application file for complete search history.

(56) References Cited

U.S. PATENT DOCUMENTS

| 5,787,404 | A | 7/1998 | Fernandez Holmann |
| 6,070,153 | A | 5/2000 | Simpson |
| 6,105,865 | A | 8/2000 | Hardesty |
| 6,592,030 | B1 | 7/2003 | Hardesty |
| 6,631,358 | B1 | 10/2003 | Ogilvie |
| 7,171,370 | B2 | 1/2007 | Burke |
| 7,480,634 | B1 | 1/2009 | Cornelius |
| 7,516,883 | B2 | 4/2009 | Hardesty et al. |
| 7,523,057 | B1 | 4/2009 | Cornelius |

(Continued)

*Primary Examiner* — Vanel Frenel
(74) *Attorney, Agent, or Firm* — Armstrong Teasdale LLP (57) ABSTRACT

In one aspect, a computer-implemented method for managing consumer savings initiated from a payment card transaction is included. The payment card transaction involves a cardholder and a payment card of the cardholder. The method uses a computer device in communication with an issuing bank. The computer device includes a memory. The method includes receiving, by the computer device, transaction data associated with the payment card transaction. The transaction data separately identifies a payment amount and a savings amount. The savings amount is an amount the cardholder selects to save. The method also includes identifying, by the computer device, a savings account number associated with the cardholder. The method further includes transmitting the savings amount and the savings account number to the issuing bank for recording as a savings accrual for the cardholder. The issuing bank is the issuer of the payment card.

20 Claims, 8 Drawing Sheets

(56) References Cited

U.S. PATENT DOCUMENTS

| | | |
|---|---|---|
| 7,577,604 B2 | 8/2009 | Ogilvie |
| 7,693,790 B2 | 4/2010 | Lawlor et al. |
| 7,725,391 B1 | 5/2010 | Ley et al. |
| 7,904,386 B2 | 3/2011 | Kalra et al. |
| 8,301,530 B2 | 10/2012 | Carretta et al. |
| 8,380,177 B2 | 2/2013 | Laracey |
| 8,417,635 B2 | 4/2013 | Kalra et al. |
| 2003/0078864 A1 | 4/2003 | Hardesty et al. |
| 2003/0105689 A1 | 6/2003 | Chandak et al. |
| 2005/0222951 A1 | 10/2005 | Sherman |
| 2006/0273158 A1 | 12/2006 | Suzuki |
| 2007/0033134 A1 | 2/2007 | Carretta et al. |
| 2007/0156554 A1 | 7/2007 | Nikoley et al. |
| 2007/0288357 A1 | 12/2007 | Holman et al. |
| 2008/0093442 A1 | 4/2008 | Hendricks |
| 2008/0255951 A1 | 10/2008 | Miller et al. |
| 2008/0270304 A1 | 10/2008 | Brown |
| 2010/0094697 A1 | 4/2010 | Cavanaugh |
| 2010/0121723 A1 | 5/2010 | Miller et al. |
| 2011/0125637 A1 | 5/2011 | Kalra et al. |
| 2011/0166994 A1 | 7/2011 | Ross et al. |
| 2011/0251892 A1 | 10/2011 | Laracey |
| 2013/0030992 A1 | 1/2013 | Carretta et al. |
| 2013/0036055 A1 | 2/2013 | Mears |
| 2013/0124351 A1 | 5/2013 | Fisher |
| 2013/0226805 A1 | 8/2013 | Griffin et al. |

000# METHODS AND SYSTEMS FOR MANAGING CONSUMER SAVINGS WITH CREDIT CARD TRANSACTIONS

CROSS REFERENCE TO RELATED APPLICATIONS

This application is a continuation application of U.S. patent application Ser. No. 14/142,395, filed Dec. 27, 2013, entitled "METHODS AND SYSTEMS FOR. MANAGING CONSUMER SAVINGS WITH CREDIT CARD TRANSACTIONS", the disclosure of which is hereby incorporated herein by reference in its entirety.

BACKGROUND OF THE DISCLOSURE

This disclosure relates generally to online payment transactions and, more specifically, to systems and methods for managing consumer savings during credit card transactions.

In some countries, such as the United States, many consumers struggle with saving portions of their income for a variety of reasons. Some consumers may save parts of their household earnings through payroll deductions, but most of these types of savings are positioned toward retirement rather than for nearer term needs. As such, typical households spend most or all of their income as they earn it, and may not have unrestrained access to cash for unexpected needs that arise.

In contrast, many consumers are in the habit of purchasing goods and services with payment cards such as credit cards. Payment cards have become a convenient means to avoid carrying cash, and the extension of credit by issuing banks gives consumers a mechanism to purchase goods and services they might not otherwise be able to immediately afford. As such, consumers are regularly conducting payment card transactions, but are not regularly saving portions of their income.

BRIEF DESCRIPTION OF THE DISCLOSURE

In one aspect, a computer-implemented method for managing consumer savings initiated from a payment card transaction is included. The payment card transaction involves a cardholder and a payment card of the cardholder. The method uses a computer device in communication with an issuing bank. The computer device includes a memory. The method includes receiving, by the computer device, transaction data associated with the payment card transaction. The transaction data separately identifies a payment amount and a savings amount. The savings amount is an amount the cardholder selects to save. The method also includes identifying, by the computer device, a savings account number associated with the cardholder. The method further includes transmitting the savings amount and the savings account number to the issuing bank for recording as a savings accrual for the cardholder. The issuing bank is the issuer of the payment card.

In another aspect, a computing device for managing consumer savings initiated from a payment card transaction is provided. The payment card transaction involves a cardholder and a payment card of the cardholder. The computing device includes a processor communicatively coupled to a memory. The computing device is in communication with an issuing bank. The computing device is programmed to receive transaction data associated with the payment card transaction. The transaction data separately identifies a payment amount and a savings amount. The savings amount is an amount the cardholder selects to save. The computing device is also programmed to identify a savings account number associated with the cardholder. The computing device is further programmed to transmit the savings amount and the savings account number to the issuing bank for recording as a savings accrual for the cardholder. The issuing bank is the issuer of the payment card.

In yet another aspect, at least one non-transitory computer-readable storage media having computer-executable instructions embodied thereon is provided. When executed by at least one processor, the computer-executable instructions cause the processor to receive transaction data associated with a payment card transaction for a payment card of a cardholder. The transaction data separately identifies a payment amount and a savings amount. The savings amount is an amount the cardholder selects to save. The computer-executable instructions also cause the processor to identify a savings account number associated with the cardholder. The computer-executable instructions further cause the processor to transmit the savings amount and the savings account number to the issuing bank for recording as a savings accrual for the cardholder. The issuing bank is the issuer of the payment card.

BRIEF DESCRIPTION OF THE DRAWINGS

FIGS. 1-8 show example embodiments of the methods and systems described herein.

DETAILED DESCRIPTION OF THE DISCLOSURE

Systems and methods are described herein for facilitating and promoting household savings during payment card transactions, such as during credit card purchases over an interchange network. During a typical payment card transaction, a cardholder (i.e., a consumer) identifies goods or services to purchase, and a merchant tabulates the purchases into a total purchase amount (i.e., an amount for which the cardholder is going to use his or her payment card to complete the purchase). In one embodiment of the present disclosure, a savings management system additionally prompts a cardholder to engage in a voluntary savings program at the time of the transaction, such as at a point-of-sale device. More specifically, the cardholder is prompted to select a savings amount to save during the payment transaction (i.e., an additional amount over and above the purchase amount). If the cardholder opts out during that transaction, then the transaction is completed with just the purchase amount. If, however, the cardholder does elect a savings amount, the system processes the transaction with both the payment amount and the savings amount.

In the example embodiment, the savings management system receives a purchase amount (i.e., the amount that is to be paid to the merchant) and a separate savings amount (i.e., the amount that is to be saved by the cardholder) with the transaction. The system treats the savings amount apart from the purchase amount by accruing the savings amount on behalf of the cardholder. During a normal billing cycle, the cardholder would be presented with a bill for purchases. For example, presume the cardholder had $800 worth of goods and services purchased during the past month, and had entered $100 worth of total savings amounts during those transactions. The cardholder's bill will include the cardholder's itemized purchase amounts as normal (i.e., a total purchase amount due of $800), but will also include a separate entry for any savings amounts that he or she had entered during the transactions (i.e., a total savings amount due of $100). When the cardholder pays the total amount of $900 in response to the bill, $800 will be used to satisfy his total purchase bill, and the other $100 will deposited into a savings account on behalf of the cardholder. Effectively, the system becomes a conduit for the cardholder to deposit money into their own savings account by enabling the cardholder to specify a savings amount during payment card transactions, billing the cardholder for that amount, then depositing the cardholder's savings dollars upon receipt (i.e., when the cardholder pays their bill).

To facilitate the savings process as described herein, the cardholder's payment card may be associated with a pre-existing bank account, or the system may establish a bank account on behalf of the cardholder. For example, the cardholder may be engaged to register for this savings service through their issuing bank (e.g., the issuer of their credit card). If the cardholder has an existing account with the issuer, the system and/or the issuer may associate the payment card with the account such that any savings amounts paid on the payment card will be deposited into the existing account. In some embodiments, the system may automatically generate a savings account (e.g., if no account has yet been associated with the payment card) on behalf of the cardholder, as well as automatically associate the cardholder's payment card with that savings account.

A technical effect of the systems and processes described herein include at least one of: (a) receiving, by the computer device, transaction data associated with the payment card transaction, wherein the transaction data separately identifies a payment amount and a savings amount, the savings amount being an amount the cardholder desires to save; (b) identifying, by the computer device, a savings account number associated with the cardholder; (c) transmitting the savings amount and the savings account number to the issuing bank for recording as a savings accrual for the cardholder, the issuing bank is the issuer of the payment card; (d) receiving the transaction data from a source device that includes at least one of a point of interaction computing device and a merchant bank computing device, wherein the source device prompts the cardholder to input the savings amount; (e) recording, in the memory, the savings amount as a savings accrual for the cardholder; (f) generating a total savings amount from a plurality of savings amounts; (g) transmitting the total savings amount to the issuing bank; (h) receiving the transaction data from a merchant bank, wherein the transaction data further includes a first code associated with the payment amount and a second code associated with the savings amount, wherein the first code is different than the second code; (i) determining that the payment card does not have an associated savings account at the issuing bank; (j) transmitting an account creation request to the issuing bank on behalf of the cardholder, the account creation request results in the creation of the associated savings account at the issuing bank; (k) generating the savings account number by one of selecting an account number from a pre-defined pool of account numbers and generating an account number using a pre-defined format; and (l) receiving a savings amount selected by the cardholder at a point-of-sale device.

As used herein, the term "database" may refer to either a body of data, a relational database management system (RDBMS), or both. As used herein, a database may include any collection of data including hierarchical databases, relational databases, flat file databases, object-relational databases, object oriented databases, and any other structured collection of records or data that is stored in a computer system. The above examples are example only, and thus are not intended to limit in any way the definition and/or meaning of the term database. Examples of RDBMS's include, but are not limited to including, Oracle® Database, MySQL, IBM® DB2, Microsoft® SQL Server, Sybase®, and PostgreSQL. However, any database may be used that enables the systems and methods described herein. (Oracle is a registered trademark of Oracle Corporation, Redwood Shores, Calif.; IBM is a registered trademark of International Business Machines Corporation, Armonk, N.Y.; Microsoft is a registered trademark of Microsoft Corporation, Redmond, Wash.; and Sybase is a registered trademark of Sybase, Dublin, Calif.)

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an example embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

As used herein, the terms "transaction card," "financial transaction card," and "payment card" refer to any suitable transaction card, such as a credit card, a debit card, a prepaid card, a charge card, a membership card, a promotional card, a frequent flyer card, an identification card, a prepaid card, a gift card, and/or any other device that may hold payment account information, such as mobile phones, Smartphones, personal digital assistants (PDAs), key fobs, and/or computers. Each type of transactions card can be used as a method of payment for performing a transaction. As used herein, the term "payment account" is used generally to refer to the underlying account with the transaction card. In addition, cardholder card account behavior can include but is not limited to purchases, management activities (e.g., balance checking), bill payments, achievement of targets (meeting account balance goals, paying bills on time), and/or product registrations (e.g., mobile application downloads).

As used herein, the term "accrue", as it is applied to savings amounts, is used generally to refer to an accumulation of one or more amounts, and does not necessarily imply the existence of a legally enforceable obligation or claim. In other words, the savings amounts that are said to accrue in the present disclosure are not necessarily legal obligations to pay. In one example embodiment, a cardholder is under no obligation to pay the savings amounts that are accrued on their behalf.

The following detailed description illustrates embodiments of the disclosure by way of example and not by way of limitation. It is contemplated that the disclosure has general application to processing financial transaction data by a third party in industrial, commercial, and residential applications.

As used herein, an element or step recited in the singular and proceeded with the word "a" or "an" should be understood as not excluding plural elements or steps, unless such exclusion is explicitly recited. Furthermore, references to "example embodiment" or "one embodiment" of the present disclosure are not intended to be interpreted as excluding the existence of additional embodiments that also incorporate the recited features.

Figure 1:
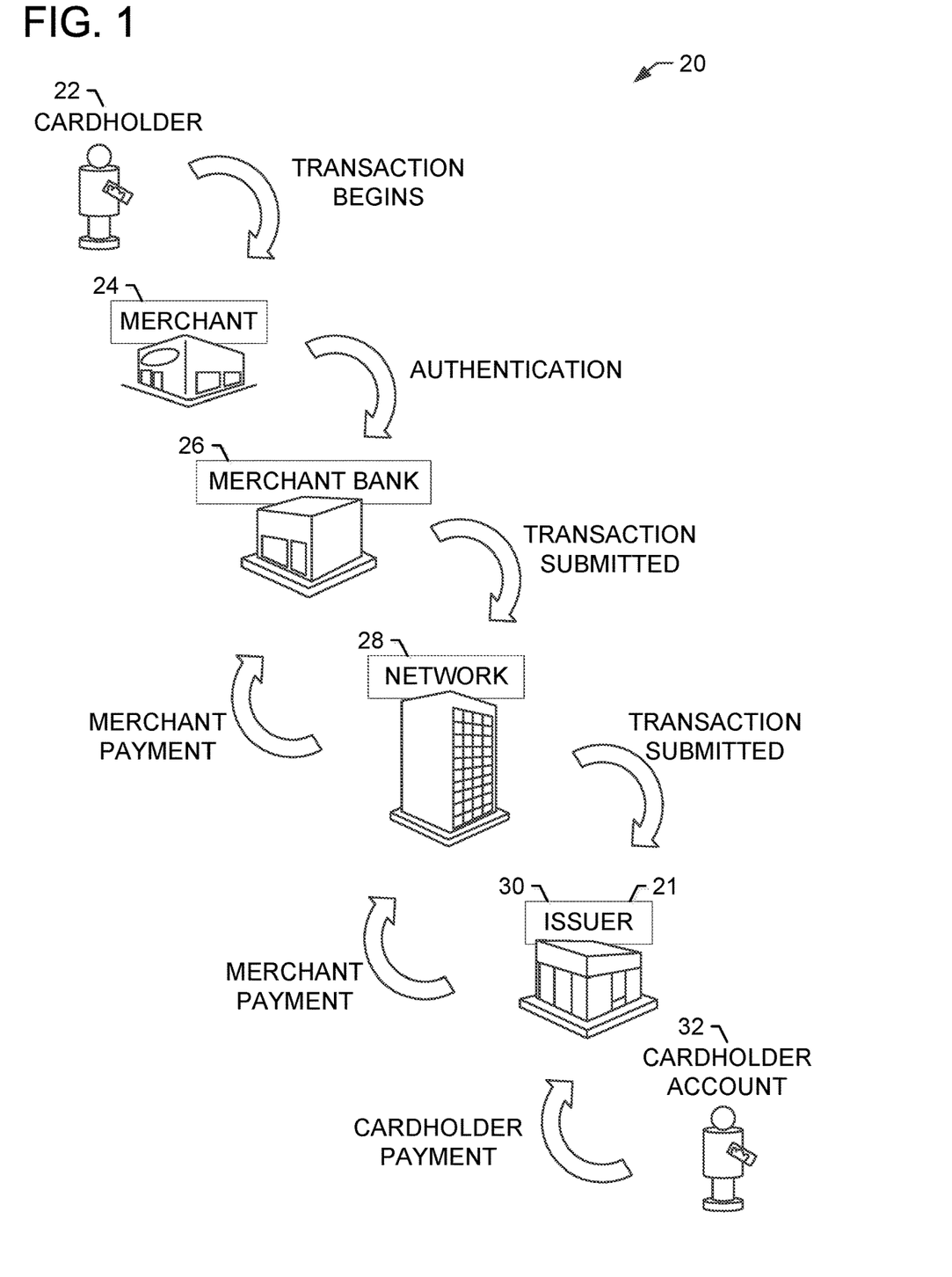
FIG. 1 is a schematic diagram illustrating an example multi-party payment card industry system for enabling ordinary payment-by-card transactions in which merchants and card issuers do not necessarily have a one-to-one relationship.

FIG. 1 is a schematic diagram illustrating an example multi-party transaction card industry system 20 for enabling cardholder savings as a part of the payment card purchase process. Embodiments described herein may relate to a transaction card system, such as a credit card payment system using the MasterCard® interchange network. The MasterCard® interchange network is a set of proprietary communications standards promulgated by MasterCard International Incorporated® for the exchange of financial transaction data and the settlement of funds between financial institutions that are members of MasterCard International Incorporated®. (MasterCard is a registered trademark of MasterCard International Incorporated located in Purchase, N.Y.).

In a typical transaction card system, a financial institution called the "issuer" issues a transaction card, such as a credit card, to a consumer or cardholder 22, who uses the transaction card to tender payment for a purchase from a merchant 24. To accept payment with the transaction card, merchant 24 must normally establish an account with a financial institution that is part of the financial payment system. This financial institution is usually called the "merchant bank," the "acquiring bank," or the "acquirer." When cardholder 22 tenders payment for a purchase with a transaction card, merchant 24 requests authorization from a merchant bank 26 for the amount of the purchase. The request may be performed over the telephone, but is usually performed through the use of a point-of-sale terminal, which reads cardholder's 22 account information from a magnetic stripe, a chip, or embossed characters on the transaction card and communicates electronically with the transaction processing computers of merchant bank 26. Alternatively, merchant bank 26 may authorize a third party to perform transaction processing on its behalf. In this case, the point-of-sale terminal will be configured to communicate with the third party. Such a third party is usually called a "merchant processor," an "acquiring processor," or a "third party processor."

Using an interchange network 28, computers of merchant bank 26 or merchant processor will communicate with computers of an issuer bank 30 to determine whether cardholder's 22 account 32 is in good standing and whether the purchase is covered by cardholder's 22 available credit line. Based on these determinations, the request for authorization will be declined or accepted. If the request is accepted, an authorization code is issued to merchant 24.

When a request for authorization is accepted, the available credit line of cardholder's 22 account 32 is decreased. Normally, a charge for a payment card transaction is not posted immediately to cardholder's 22 account 32 because bankcard associations, such as MasterCard International Incorporated®, have promulgated rules that do not allow merchant 24 to charge, or "capture," a transaction until goods are shipped or services are delivered. However, with respect to at least some debit card transactions, a charge may be posted at the time of the transaction. When merchant 24 ships or delivers the goods or services, merchant 24 captures the transaction by, for example, appropriate data entry procedures on the point-of-sale terminal. This may include bundling of approved transactions daily for standard retail purchases. If cardholder 22 cancels a transaction before it is captured, a "void" is generated. If cardholder 22 returns goods after the transaction has been captured, a "credit" is generated. Interchange network 28 and/or issuer bank 30 stores the transaction card information, such as a type of merchant, amount of purchase, date of purchase, in a database 120 (shown in FIG. 2).

After a purchase has been made, a clearing process occurs to transfer additional transaction data related to the purchase among the parties to the transaction, such as merchant bank 26, interchange network 28, and issuer bank 30. More specifically, during and/or after the clearing process, additional data, such as a time of purchase, a merchant name, a type of merchant, purchase information, cardholder account information, a type of transaction, savings information, itinerary information, information regarding the purchased item and/or service, and/or other suitable information, is associated with a transaction and transmitted between parties to the transaction as transaction data, and may be stored by any of the parties to the transaction.

After a transaction is authorized and cleared, the transaction is settled among merchant 24, merchant bank 26, and issuer bank 30. Settlement refers to the transfer of financial data or funds among merchant's 24 account, merchant bank 26, and issuer bank 30 related to the transaction. Usually, transactions are captured and accumulated into a "batch," which is settled as a group. More specifically, a transaction is typically settled between issuer bank 30 and interchange network 28, and then between interchange network 28 and merchant bank 26, and then between merchant bank 26 and merchant 24.

Figure 2:
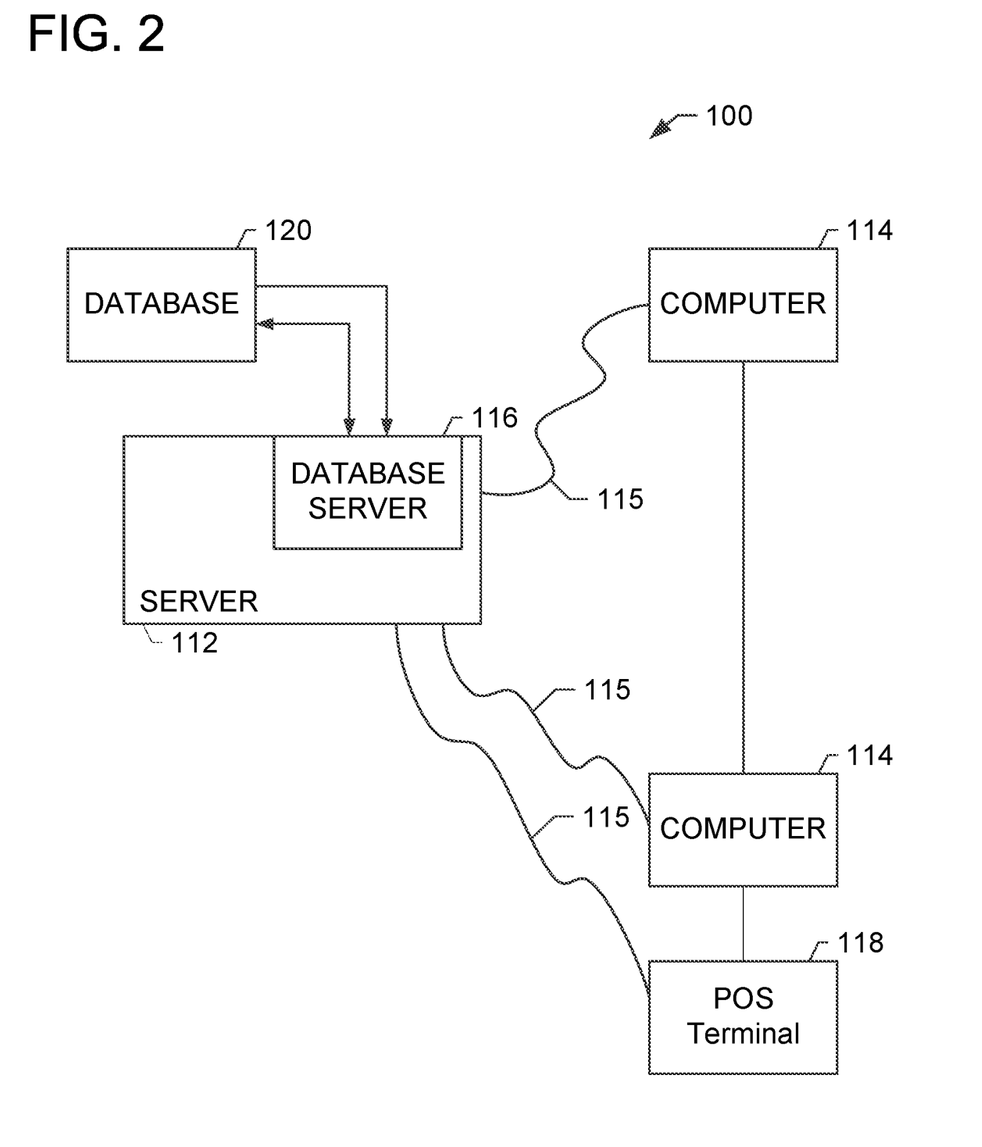
FIG. 2 is a simplified block diagram of an example savings management system including a plurality of computer devices in accordance with one example embodiment of the present disclosure.

FIG. 2 is a simplified block diagram of an example savings management system 100 including a plurality of computer devices connected in communication in accordance with the present disclosure. In the example embodiment, system 100 may be used for managing cardholder savings during payment card transactions in the interchange environment shown in FIG. 1.

More specifically, in the example embodiment, system 100 includes a server system 112 in communication with a point-of-sale (POS) terminal 118 at a merchant location, such as merchant 24 (shown in FIG. 1). The POS terminal 118 may be used to enter savings amounts by cardholder 22 (shown in FIG. 1) during payment card transactions, as described herein.

In the example embodiment, server system 112 is also in communication with a plurality of client sub-systems, also referred to as client systems 114. In one embodiment, client systems 114 are computers including a web browser, such that server system 112 is accessible to client systems 114 using the Internet. Client systems 114 are interconnected to the Internet through many interfaces including a network 115, such as a local area network (LAN) or a wide area network (WAN), dial-in-connections, cable modems, special high-speed Integrated Services Digital Network (ISDN) lines, and RDT networks. Client systems 114 could be any device capable of interconnecting to the Internet including a web-based phone, PDA, or other web-based connectable equipment.

In the example embodiment, system 100 also includes POS terminals 118, which may be connected to client systems 114 and may be connected to server system 112. POS terminals 118 are interconnected to the Internet through many interfaces including a network, such as a local area network (LAN) or a wide area network (WAN), dial-in-connections, cable modems, wireless modems, and special high-speed ISDN lines. POS terminals 118 could be any device capable of interconnecting to the Internet and including an input device capable of reading information from a cardholder's financial transaction card. In some embodiments, POS terminal 118 may be a cardholder's personal computer, such as when conducting an online purchase through the Internet. As used herein, the terms POS device, POS terminal, and point of interaction device are used broadly, generally, and interchangeably to refer to any device in which a cardholder interacts with a merchant to complete a payment card transaction.

A database server 116 is connected to database 120, which contains information on a variety of matters, as described below in greater detail. In one embodiment, centralized database 120 is stored on server system 112 and can be accessed by potential users at one of client systems 114 by logging onto server system 112 through one of client systems 114. In an alternative embodiment, database 120 is stored remotely from server system 112 and may be non-centralized.

Database 120 may include a single database having separated sections or partitions or may include multiple databases, each being separate from each other. Database 120 may store transaction data generated as part of sales activities and savings activities conducted over the processing network including data relating to merchants, account holders or customers, issuers, acquirers, savings amounts, savings account information, and/or purchases made. Database 120 may also store account data including at least one of a cardholder name, a cardholder address, an account number, and other account identifier. Database 120 may also store merchant data including a merchant identifier that identifies each merchant registered to use the network, and instructions for settling transactions including merchant bank account information. Database 120 may also store purchase data associated with items being purchased by a cardholder from a merchant, and authorization request data. Database 120 may also store savings account information associated with issuing banks and cardholders.

In the example embodiment, one of client systems 114 may be associated with acquirer bank 26 (shown in FIG. 1) while another one of client systems 114 may be associated with issuer bank 30 (shown in FIG. 1). POS terminal 118 may be associated with a participating merchant 24 (shown in FIG. 1) or may be a computer system and/or mobile system used by a cardholder making an on-line purchase or payment. Server system 112 may be associated with interchange network 28. In the exemplary embodiment, server system 112 is associated with a network interchange, such as interchange network 28, and may be referred to as an interchange computer system. Server system 112 may be used for processing transaction data. In addition, client systems 114 and/or POS terminal 118 may include a computer system associated with at least one of an online bank, a bill payment outsourcer, an acquirer bank, an acquirer processor, an issuer bank associated with a transaction card, an issuer processor, a remote payment system, a token requestor, a token provider, and/or a biller.

Figure 3:
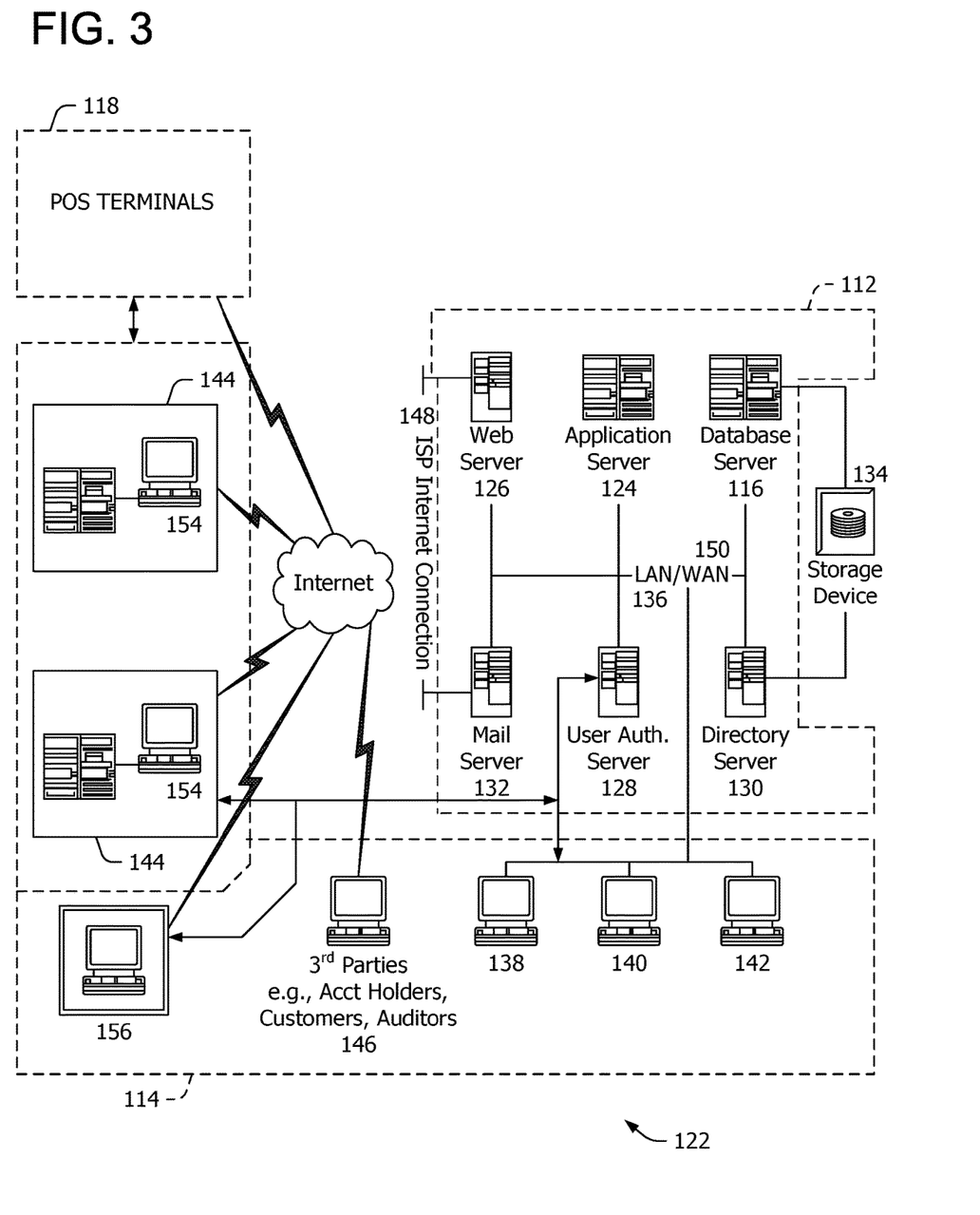
FIG. 3 is an expanded block diagram of an example embodiment of a server architecture of the savings management system including the plurality of computer devices in accordance with one example embodiment of the present disclosure.

FIG. 3 is an expanded block diagram of an exemplary embodiment of a server architecture of a savings management system 122 including other computer devices in accordance with one embodiment of the present disclosure. Components in system 122, identical to components of system 100 (shown in FIG. 2), are identified in FIG. 3 using the same reference numerals as used in FIG. 2. Savings management system 122 includes server system 112, client systems 114, and POS terminals 118. Server system 112 further includes database server 116, a transaction server 124, a web server 126, a fax server 128, a directory server 130, and a mail server 132. A storage device 134 is coupled to database server 116 and directory server 130. Servers 116, 124, 126, 128, 130, and 132 are coupled in a local area network (LAN) 136. In addition, an issuer bank workstation 138, an acquirer bank workstation 140, and a third party processor workstation 142 may be coupled to LAN 136. In the example embodiment, issuer bank workstation 138, acquirer bank workstation 140, and third party processor workstation 142 are coupled to LAN 136 using network connection 115. Workstations 138, 140, and 142 are coupled to LAN 136 using an Internet link or are connected through an Intranet.

Each workstation 138, 140, and 142 is a personal computer having a web browser. Although the functions performed at the workstations typically are illustrated as being performed at respective workstations 138, 140, and 142, such functions can be performed at one of many personal computers coupled to LAN 136. Workstations 138, 140, and 142 are illustrated as being associated with separate functions only to facilitate an understanding of the different types of functions that can be performed by individuals having access to LAN 136.

Server system 112 is configured to be communicatively coupled to various individuals, including employees 144 and to third parties, e.g., account holders, customers, auditors, developers, cardholders (i.e., consumers), merchants, acquirers, issuers, etc., 146 using an ISP Internet connection 148. The communication in the exemplary embodiment is illustrated as being performed using the Internet, however, any other wide area network (WAN) type communication can be utilized in other embodiments, i.e., the systems and processes are not limited to being practiced using the Internet. In addition, and rather than WAN 150, local area network 136 could be used in place of WAN 150.

In the exemplary embodiment, any authorized individual having a workstation 154 can access system 122. At least one of the client systems includes a manager workstation 156 located at a remote location. Workstations 154 and 156 are personal computers having a web browser. Also, workstations 154 and 156 are configured to communicate with server system 112. Furthermore, fax server 128 communicates with remotely located client systems, including a client system 156 using a telephone link. Fax server 128 is configured to communicate with other client systems 138, 140, and 142 as well.

Figure 4:
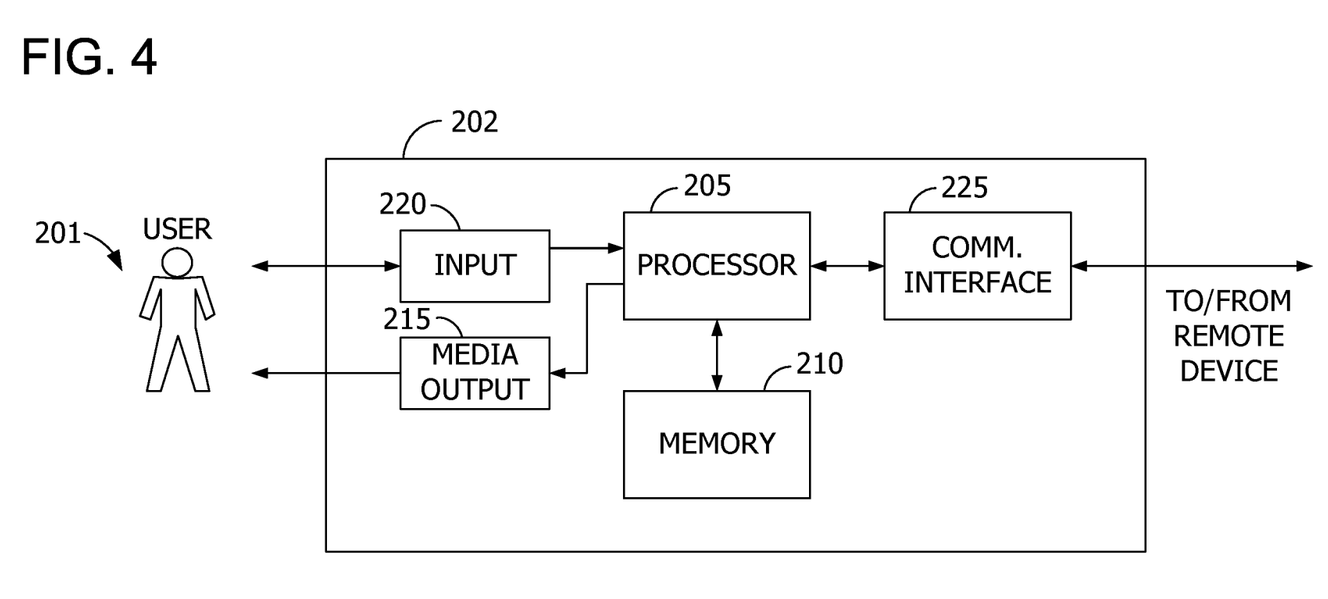
FIG. 4 illustrates an example configuration of a client system shown in FIGS. 2 and 3.

FIG. 4 illustrates an exemplary configuration of a user system 202 operated by a user 201, such as cardholder 22 (shown in FIG. 1). User system 202 may include, but is not limited to, client systems 114, 138, 140, and 142, POS terminal 118, workstation 154, and manager workstation 156. In the exemplary embodiment, user system 202 includes a processor 205 for executing instructions. In some embodiments, executable instructions are stored in a memory area 210. Processor 205 may include one or more processing units, for example, a multi-core configuration. Memory area 210 is any device allowing information such as executable instructions and/or written works to be stored and retrieved. Memory area 210 may include one or more computer readable media.

User system 202 also includes at least one media output component 215 for presenting information to user 201. Media output component 215 is any component capable of conveying information to user 201. In some embodiments, media output component 215 includes an output adapter such as a video adapter and/or an audio adapter. An output adapter is operatively coupled to processor 205 and operatively couplable to an output device such as a display device, a liquid crystal display (LCD), organic light emitting diode (OLED) display, or "electronic ink" display, or an audio output device, a speaker or headphones.

In some embodiments, user system 202 includes an input device 220 for receiving input from user 201. Input device 220 may include, for example, a keyboard, a pointing device, a mouse, a stylus, a touch sensitive panel, a touch pad, a touch screen, a gyroscope, an accelerometer, a position detector, or an audio input device. A single component such as a touch screen may function as both an output device of media output component 215 and input device 220. User system 202 may also include a communication interface 225, which is communicatively couplable to a remote device such as server system 112. Communication interface 225 may include, for example, a wired or wireless network adapter or a wireless data transceiver for use with a mobile phone network, Global System for Mobile communications (GSM), 3G, or other mobile data network or Worldwide Interoperability for Microwave Access (WIMAX).

Stored in memory area 210 are, for example, computer readable instructions for providing a user interface to user 201 via media output component 215 and, optionally, receiving and processing input from input device 220. A user interface may include, among other possibilities, a web browser and client application. Web browsers enable users, such as user 201, to display and interact with media and other information typically embedded on a web page or a website from server system 112. A client application allows user 201 to interact with a server application from server system 112.

Figure 5:
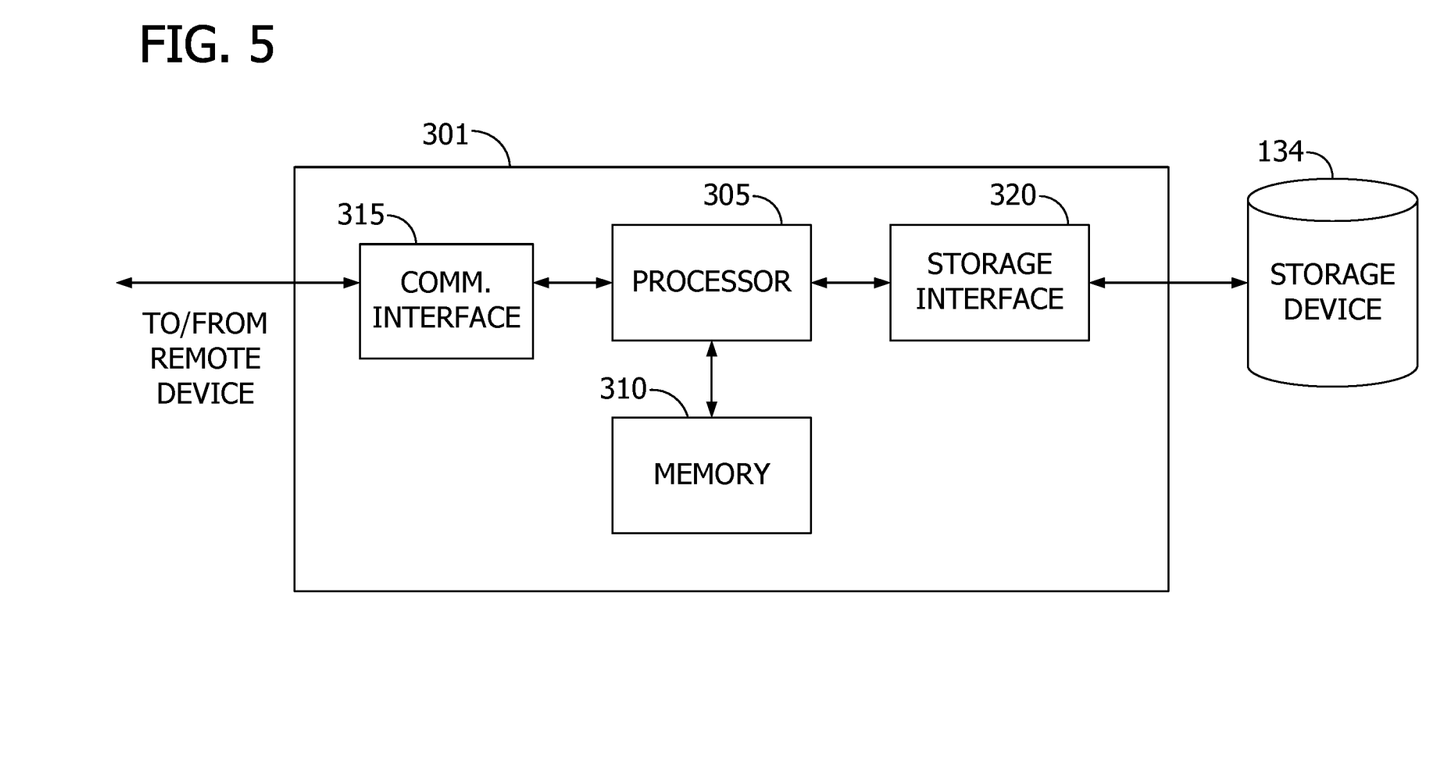
FIG. 5 illustrates an example configuration of a server system shown in FIGS. 2 and 3.

FIG. 5 illustrates an exemplary configuration of a server system 301 such as server system 112 (shown in FIGS. 2 and 3). Server system 301 may include, but is not limited to, database server 116, transaction server 124, web server 126, fax server 128, directory server 130, and mail server 132.

Server system 301 includes a processor 305 for executing instructions. Instructions may be stored in a memory area 310, for example. Processor 305 may include one or more processing units (e.g., in a multi-core configuration) for executing instructions. The instructions may be executed within a variety of different operating systems on the server system 301, such as UNIX, LINUX, Microsoft Windows®, etc. It should also be appreciated that upon initiation of a computer-based method, various instructions may be executed during initialization. Some operations may be required in order to perform one or more processes described herein, while other operations may be more general and/or specific to a particular programming language (e.g., C, C#, C++, Java, or other suitable programming languages, etc.).

Processor 305 is operatively coupled to a communication interface 315 such that server system 301 is capable of communicating with a remote device such as a user system or another server system 301. For example, communication interface 315 may receive requests from user system 114 via the Internet, as illustrated in FIGS. 2 and 3.

Processor 305 may also be operatively coupled to a storage device 134. Storage device 134 is any computer-operated hardware suitable for storing and/or retrieving data. In some embodiments, storage device 134 is integrated in server system 301. For example, server system 301 may include one or more hard disk drives as storage device 134. In other embodiments, storage device 134 is external to server system 301 and may be accessed by a plurality of server systems 301. For example, storage device 134 may include multiple storage units such as hard disks or solid state disks in a redundant array of inexpensive disks (RAID) configuration. Storage device 134 may include a storage area network (SAN) and/or a network attached storage (NAS) system.

In some embodiments, processor 305 is operatively coupled to storage device 134 via a storage interface 320. Storage interface 320 is any component capable of providing processor 305 with access to storage device 134. Storage interface 320 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 305 with access to storage device 134.

Memory area 310 may include, but are not limited to, random access memory (RAM) such as dynamic RAM (DRAM) or static RAM (SRAM), read-only memory (ROM), erasable programmable read-only memory (EPROM), electrically erasable programmable read-only memory (EEPROM), and non-volatile RAM (NVRAM). The above memory types are exemplary only, and are thus not limiting as to the types of memory usable for storage of a computer program.

Figure 6:
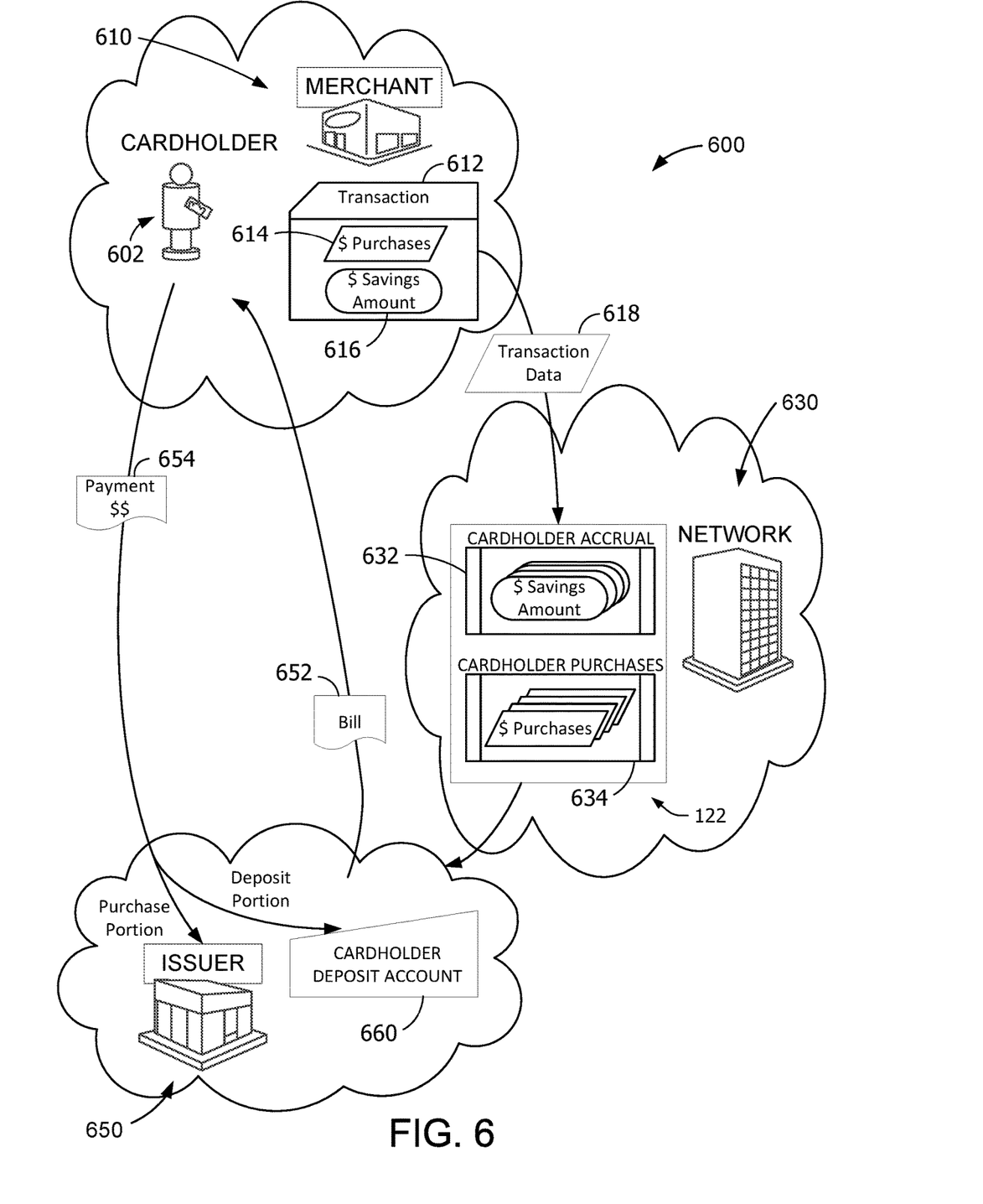
FIG. 6 is an example payment network environment including the savings management server shown in FIG. 2 in which a consumer is prompted and elects to make savings contributions during a payment card transaction.

FIG. 6 is an example payment network environment 600 including savings management system 122 (shown in FIG. 3) in which a cardholder 602 is prompted and elects to make savings contributions during payment card transactions. Cardholder 602 may, for example, be purchasing items or services at a merchant 610 location, or may be interacting online with merchant 610 to perform a transaction with a payment card, such as a credit card. In the example embodiment, cardholder 602 and merchant 610 are engaged at a point-of-sale (POS) device 118 (shown in FIG. 2) to perform the transaction. During the transaction, merchant 610 and/or cardholder 602 inputs a purchase amount 614 into the point-of-sale device 118. The purchase amount represents the amount merchant 610 is charging for the goods or services that cardholder 602 is purchasing as a part of the transaction.

Additionally, in the example embodiment, point-of-sale device 118 prompts cardholder 602 for a savings amount 616 that cardholder 602 would like to save. Savings amounts 616, in some embodiments, represents a non-binding commitment by the cardholder to send that amount to an issuing bank, such as issuer 650, as a part of their normal credit card billing cycle, and for purposes of saving that amount. In other embodiments, cardholder 602 may have configured a predefined amount, or a pre-defined percentage of the purchase price, to include as a savings amount 616 in all transactions, or in some subset of transactions such as all transactions over a certain dollar value. As such, cardholder 602 may have agreed to participate in the savings program prior to the transaction, and savings amount 616 may be computed or otherwise determined during or after the transaction.

In the example embodiment, cardholder 602 may enter $0, or otherwise decline participation for savings during the transaction. Alternatively, cardholder 602 may enter a (non-zero) savings amount 616, representing a wish to participate in saving as a part of the savings program. Both purchase amount 614 and savings amount 616 become a part of a transaction 612 that is transmitted to a payment network 630 as a part of a payment authentication process. In the example embodiment, network 630 includes an acquirer interface processor and an issuer interface processor (not separately shown in FIG. 6) that facilitates transactions from the merchant POS device 118 (generally, merchant 24 (shown in FIG. 1)) to the merchant bank 26 (shown in FIG. 1), network 28 (shown in FIG. 1), and through to issuer 30 (shown in FIG. 1, and similar to issuer 650). Transaction 612 (i.e., transaction data 618) is transmitted from merchant 610 to the acquirer processor.

In the example embodiment, interchange network 630 (sometimes referred to as payment network) operates a savings management system such as savings management system 122. Savings management system 122 receives transaction 612 (i.e., including transaction data 618) from merchant 610 and separately identifies savings amount 616 from purchase amount 614. Savings amount 616 is defined as a unique item and includes a six-digit standard industry classification (SIC) code of "609999-VS" (where the "VS" stands for voluntary savings).

Savings management system 122 tracks and processes cardholder purchases 634 (i.e., purchase amounts 614) as is known in the art (e.g., authenticates the purchase amount 614, as described above in reference to FIG. 1). Additionally, in one embodiment, savings management system 122 separately identifies savings amount 616 as an item not requiring payment authorization and passes savings amount 616 on to issuer 650 for accrual on behalf of cardholder 602. In the example embodiment, as savings management system 122 receives savings amounts 616 with their payment card transactions, savings management system 122 accrues savings amounts 632 for each cardholder 602. Savings management system 122 tracks savings amounts 632 separately, and provides the necessary information to, for example, issuer 650 (i.e., the issuing bank for cardholder's 302 payment card). In other words, savings management system 122 provides both purchase amounts 634 and savings amounts 632 to issuer 650 during its course of business, with purchase amounts 634 going through the normal authentication process, and with savings amounts 632 accruing on behalf of cardholder 602 without traditional authentication and clearance components.

Issuer 650 receives the cardholder's 602 purchase amounts 634 and savings amounts 632 (collectively referred to herein as transaction data) from network 630. In some embodiments, savings management system 122 may transmit transaction data (including savings amount 616) to issuer 650 during a request for authorization of transaction 612, and issuer 650 may accrue savings amounts 632. In the example embodiment, savings management system 122 accrues a plurality of savings amounts 632 for cardholder 602 and transmits savings amounts 632 to issuer 650 at a later time, such as during a normal billing cycle routine. In other embodiments, issuer 650 receives savings amount 616 individually from savings management system 122 and accrues the amount in a database for later billing to consumer (i.e., issuer 650 accrues savings amounts 632).

Subsequently, issuer 650 compiles and transmits a bill 652 to cardholder 602, such as during a monthly billing cycle. Bill 652 may include, for example, an itemized list of purchases amounts 634 and other identifying data associated with each purchase. In addition, in the example embodiment, bill 652 includes an itemized list of savings amounts 632 identifying savings amount 616 and other identifying data associated with transaction 612. In some embodiments, savings amounts 632 may be presented as an aggregated total. In other embodiments, the aggregated total may include both savings amounts 632 (i.e., savings amounts from the most recent pay cycle) as well as any previously presented savings amounts that have not yet been paid (i.e., carry-over savings amounts from prior pay cycles). As used herein, the terms "savings amount due" and "purchase amount due" is used to refer to the total of savings amounts and the total purchase amounts, respectively, that is presented to cardholder 602 on bill 652. In other words, savings amounts and purchase amounts may be tracked and addressed separately such that payments made by cardholder 602 to issuer 650 may apply to either savings amounts due, purchase amounts due, or both.

Cardholder 602 receives bill 652 and remits a payment 652 to issuer 650. As used herein, the term "payment amount" is used to refer to the amount of the payment remitted from cardholder 602 to issuer 650. In the example embodiment, the payment amount is a single amount (i.e., not separated or separately distinguished by cardholder 602 as to how the payment amount is to be applied to the purchase or savings amount due). In other embodiments, cardholder 602 may specify how much of the payment amount is to be applied to the purchase amount due, how much is to be applied to the savings amount due, or both. In the example embodiment, the payment amount is applied first to any outstanding balance due for purchases (i.e., to purchase amount due), and only any excess is applied to the savings amount due. As used herein, the terms "purchase portion" and "deposit portion" are used to refer to the portion of the payment amount that is applied to the purchase amount due and to the deposit amount due, respectively.

In the example embodiment, cardholder 602 has a savings account 660 (also referred to herein as a deposit account) established with issuer 650. Further, cardholder's 602 payment card is also associated with savings account 660 such that any savings amounts 616 entered with cardholder's 602 transactions 612 and subsequently paid by cardholder 602 (i.e., in the form of deposit portions paid on deposit amounts due) will flow into savings account 660. In other words, savings account 660 is tied to the payment card in order to receive and accumulate the cardholder deposits. In some embodiments, issuer 650, network 630, and/or cardholder 602 may establish savings account 660 prior to enabling savings amounts 632 to accrue and be billed to cardholder 602. For example, interchange network 20 may not allow entry of deposit amounts (e.g., may not prompt cardholder 602 for a savings amount) during transactions if network 20 determines that no savings account 660 has yet been configured and associated with cardholder's 602 payment card. In the example embodiment, one or more of merchant bank 26 (shown in FIG. 1), network 630 (i.e., savings management system 122), and/or issuer 650 may perform an account creation operation to create savings account 660 with issuer 650 on behalf of cardholder 602 if cardholder's 602 payment card is not yet associated with a savings account 660. In some embodiments, such an operation may occur at approximately the time of a first receipt of a transaction 612 that includes a savings amount 616. In other embodiments, one or more of merchant bank 26, network 630, and issuer 650 may initiate account creation at a later date, such as prior to the billing cycle to the cardholder, or at the time that a payment amount is received whose bill included a non-zero savings amount due, or at the time that a payment amount is received that includes a non-zero deposit portion.

During operation, for example, cardholder 602 has a payment card issued by issuer 650, but has not yet associated the payment card with a savings account 660 (i.e., savings account 660 does not yet exist, or exists but is not yet directly linked to the payment card). Cardholder 602 enters into transaction 612 with merchant 610 using the cardholder's 602 payment card at merchant's 610 point-of-sale device 118. In this example, the present transaction includes goods totaling $50 (i.e., a purchase amount 614 of $50), but the transaction could be for any dollar amount in other instances. As a part of the transaction process, cardholder 602 is prompted for a savings amount 616, and cardholder 602 elects to save $10 (i.e., a savings amount 616 of $10).

During authentication of a typical payment card transaction, transaction 612 would be submitted from merchant 610 to a merchant bank, such as merchant bank 26, through an interchange network such as network 630, and down to an issuer 650 as described above in reference to FIG. 1. The transaction may only include a purchase amount, such as purchase amount 614, for purposes of authenticating the purchase with the issuer of the cardholder's payment card. In the example embodiment, transaction 612 includes the purchase amount 614 (i.e., $50) with its own SIC code, as well as the savings amount 616 (i.e., $10) with its own code (e.g., 609999-VS). Purchase amount 614 of $50 is processed as traditionally performed by the payment network (i.e., authenticated with the issuer, who may either approve or reject the $50 payment amount).

In the example embodiment, savings management system 122 maintains a database that includes list of cardholder's 620 payment card numbers (PAN's) and their associated savings account numbers (i.e., identifiers indicating cardholder savings account 660 for each cardholder 602). If cardholder's 620 PAN already has an associated savings account 660, savings management system 122 identifies the savings account number 660 to associate with savings amount 616. In some situations, cardholder's 602 payment card may not yet be associated with a savings account (i.e., there is no savings account yet identified for cardholder 602). In the example embodiment, issuer 650 defines a pool of account numbers for use by network 630. In some embodiments, issuer 650 defines an account format template (i.e., an account number format identifying the structure properly-complying account numbers), and optionally a range of account numbers. Savings management system 122 assigns a savings account number to associate with the cardholder's 602 payment card. As such, savings management system 122 identifies the savings account number 660 to associate with savings amount 616.

In other embodiments, savings management system 122 sends an account creation request to issuer to open a savings account on behalf of cardholder 602, and additionally to link this new savings account with cardholder's 602 payment card for purposes of enabling receipt of voluntary savings amounts as described herein. Issuer 650 receives the request from network 630, creates a savings account 660 in the name of cardholder 602, and associates savings account 660 with cardholder's 602 payment card (i.e., the credit card being used during transaction 612). Accordingly, savings account 660 is then prepared to receive savings amounts once cardholder 602 pays. In some embodiments, network 630 provides the savings account number to issuer 650, who establishes savings account 660. In other embodiments, issuer 650 generates the savings account number, establishes savings account 660, and then transmits the savings account number to network 630 for association with cardholder's 602 PAN.

In the example embodiment, network 630 transmits savings amount 616 to issuer 650 along with the associated savings account number of savings account 660. In other embodiments, network 630 transmits savings amount 616 to issuer 650, and issuer 650 determines cardholder savings account 660 based on cardholder's 602 PAN.

Further, in the present example, the transaction 612 is the only transaction conducted by cardholder 602 using the payment card during the present pay cycle. In other words, purchase amounts 634 include only the one $50 purchase amount, and savings amounts 632 include only the one $10 savings amount. At the end of the current pay cycle, issuer 650 receives purchase amounts 634 and savings amounts 632 (i.e., $50 to merchant 610 and $10 to savings, respectively) from network 630. Issuer prepares and mails cardholder's 602 monthly bill 652. Bill 652 includes a total amount due of $60, broken down and summarized as $50 total for purchases (i.e., purchase amount due) and $10 for savings (i.e., savings amount due). Additionally, bill 652 also includes an itemization of purchase amount 614 and savings amount 616.

Cardholder 602 receives bill 652 and remits a payment to issuer for $60 (i.e., payment amount of $60). In this example, the cardholder 602 did not distinguish how the payment should be applied (e.g., sent in a check for $60 without any other markings on the bill). Issuer 650 may thus have a default policy to apply unspecified payments first to any outstanding payment amounts due, and then any remainder amounts to any savings amounts due. As such, when issuer 650 receives the remittance of $60, issuer applies $50 of the payment amount to the $50 payment amount due (i.e., of the $60 payment amount, $50 becomes the purchase portion). Further, the remainder of the payment amount, $10, is then applied to savings amount due (i.e., of the $60 payment amount, $10 becomes the deposit portion). Issuer identifies that cardholder's 602 payment card is associated with savings account 660, and accordingly applies the deposit portion of $10 to savings account 660. As such, cardholder 602 has voluntarily elected to save $10 during a payment card transaction, and made good on his own commitment by sending in the $10 for his own savings during the normal payment of his monthly bill.

In other instances, the issuer 650 may prompt the cardholder 602 to confirm that the remaining amount (e.g., the $10) should be applied to the savings account 660. For example, the prompt may be communicated to the customer electronically, such as by short message service (SMS), an interactive voice response (VR) system, a confirmation email, or the like. If the cardholder 602 denies deposit of the remainder to the savings account 660, then issuer 650 credits the remainder to the cardholder's 602 payment card account (i.e., as a balance credit, or as further payment toward an outstanding balance), or issuer 650 issues cardholder 602 a refund. If the cardholder accepts deposit of the remainder to the savings account 660, then issuer 650 deposits the remainder (e.g., the $10) into savings account 660.

While some of the example embodiments describe systems and methods of consumer savings during credit card transactions, it should be understood that these systems and methods may be applicable to other types of payment card transactions.

Further, the savings transactions as described herein are sometimes referred to as "commitments" or amounts "due." However, it should be understood that, in some embodiments, no payment obligation necessarily arises based on, for example, cardholder 602 entering savings amount 616 as a part of a transaction. In some embodiments, any unpaid savings amounts due may be eliminated. In other words, "savings amounts" may be thought of and treated as a non-obligatory cardholder's promise to themselves, and not like the obligation to pay that arises when a cardholder purchases goods or services from a merchant. As such, "unpaid savings amounts due" merely represent a cardholder's unfulfilled promise to themselves to save.

In some embodiments, savings account 660 may not be a savings account hosted by issuer 650. As such, the deposit portion may be transmitted from issuer 650 to the bank hosting cardholder's savings account 660 for deposit on behalf of cardholder 602.

Figure 7:
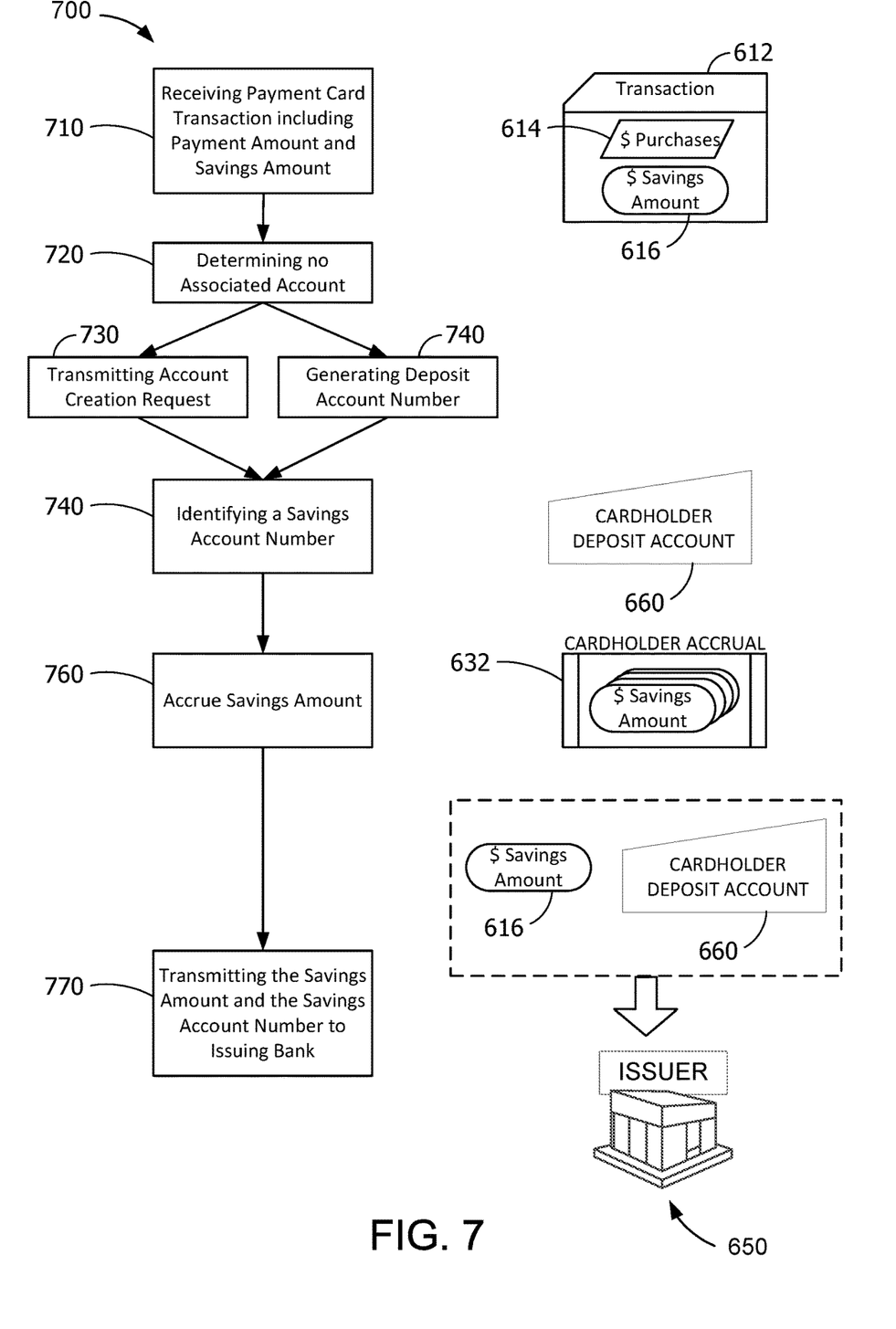
FIG. 7 is an example method for managing consumer savings during payment card transactions in the payment network environment shown in FIG. 6.

FIG. 7 is an example method 700 for managing consumer savings during payment card transactions in an interchange environment 600 such as shown in FIG. 6. In the example embodiment, method 700 is performed by a computing system such as server 112 (shown in FIG. 2), savings management system 122 (shown in FIGS. 3 and 6), or by computing device 810 (shown in FIG. 8). In the example embodiment, method 700 includes receiving 710, by a computer device (e.g., savings management system 122), a payment card transaction such as transaction 612. The payment card transaction separately identifies a payment amount and a savings amount, such as payment amount 614 and savings amount 616. The savings amount is an amount the cardholder associated with the payment card transaction desires to save. In some embodiments, receiving transaction data associated with the payment card transaction further includes receiving a savings amount selected by the cardholder, such as cardholder 602 (shown in FIG. 6), at a point-of-sale device, such as POS device 118 (shown in FIG. 2). In other embodiments, the computing system is in communication with an interchange network, such as network 630 (shown in FIG. 6), and the payment card transaction is received from a merchant bank. The payment card transaction further includes a first code associated with and identifying the payment amount 614, and a distinct (i.e., separate) code associated with the savings amount 616 and indicating that the savings amount is for savings and is not a purchase amount.

In the example embodiment, method 700 includes identifying 750, by the computer device, a savings account number (generally shown as savings account 660) associated with the cardholder, and transmitting 770 the savings amount 616 and the savings account number 660 to the issuing bank 650. The issuing bank is the issuer of the payment card, and the savings amount is for saving on behalf of the cardholder using the savings account number. The savings account number identifies a savings account associated with the cardholder and/or the cardholder's payment card.

In some embodiments, method 700 includes determining 720 that the payment card does not have an associated savings account, and transmitting 730 an account creation request to the issuing bank on behalf of the cardholder, the account creation request results in the creation of the associated savings account at the issuing bank for receipt of the savings amount. The issuing bank may send the account number 660 back to the network for association with the present payment card transaction and/or future transactions. In other embodiments, method 700 includes determining 720 that the payment card does not have an associated savings account, and generating 740 the savings account number 660 by one of selecting an account number from a pre-defined pool of account numbers and computing an account number using a pre-defined format. The generated savings account number 660 is then associated with one or more of the payment card, the payment card transaction, and the cardholder.

In some embodiments, method 700 includes receiving 710 the payment card transaction from a source device that includes one of a point of interaction computing device and a merchant bank computing device. The source device prompts the cardholder to identify the savings amount. In other embodiments, method 700 includes accruing 750, in the memory, the savings amount on behalf of the cardholder. Method 700 may also include generating a total savings amount from a plurality of savings amounts, and transmitting the total savings amount to the issuing bank.

Figure 8:
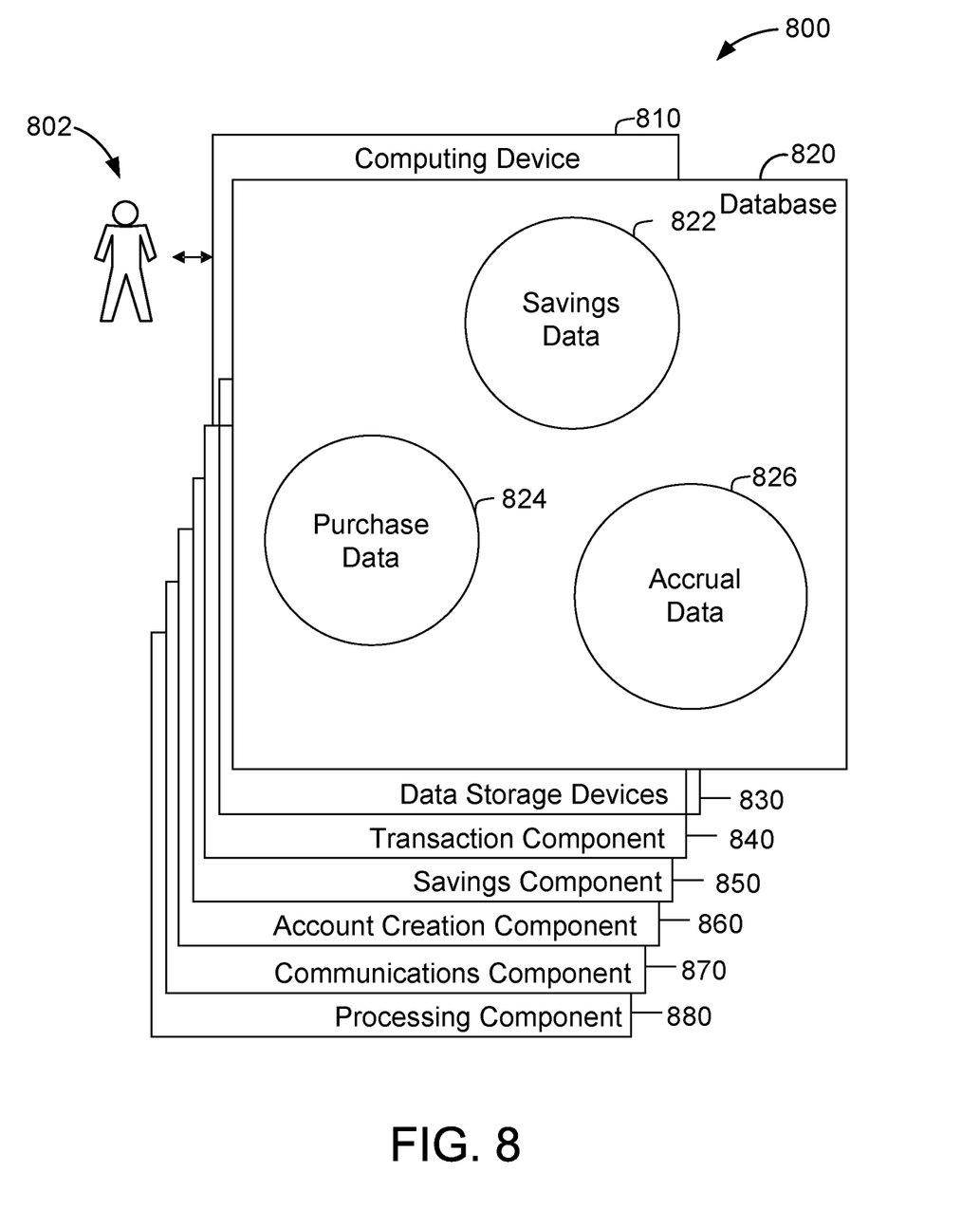
FIG. 8 shows an example configuration of a database within a computing device, along with other related computing components, that may be used to manage consumer savings during payment card transactions.

FIG. 8 shows an example configuration 800 of a database 820 within a computing device 810, along with other related computing components, that may be used to manage consumer savings during payment card transactions. In some embodiments, computing device 810 is similar to server system 112 (shown in FIG. 2), savings management system 122 (shown in FIGS. 3 and 6), and/or server system 301

(shown in FIG. 5). Database 820 is coupled to several separate components within computing device 810, which perform specific tasks.

In the exemplary embodiment, database 820 includes savings data 822, purchase data 824, and accrual data 826. In some embodiments, database 820 is similar to database 120 (shown in FIG. 2). Savings data 922 includes information associated with savings amounts, such as described in reference to FIG. 6. Purchase data 924 includes information associated with purchase amounts, such as described in reference to FIG. 6. Accrual data 926 includes data associated with accrual of savings amounts such as discussed in reference to FIG. 6.

Computing device 810 includes the database 820, as well as data storage devices 830. Computing device 810 also includes a transaction component 840 for interacting with merchants and/or merchant banks as a part of the transaction process, as described in reference to FIGS. 1 and 6. Computing device 810 also includes an savings component 850 for identifying savings amounts (i.e., savings data 822) and managing accrual data 826. An account creation component 860 is also included for processing account creation requests with, for example, issuer banks. A communications component 870 is also included for communicating with merchants, merchant banks, point-of-sale devices, and/or issuing banks. A processing component 880 assists with execution of computer-executable instructions associated with the tokenization system.

As will be appreciated based on the foregoing specification, the above-described embodiments of the disclosure may be implemented using computer programming or engineering techniques including computer software, firmware, hardware or any combination or subset thereof, wherein the technical effect is a flexible system for managing consumer savings during payment card transactions. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A computer-implemented method for managing consumer savings initiated by a payment account transaction for a purchase made by an accountholder at a merchant device using a payment account, the method using a savings management computing device in communication with an issuing bank computing device, the savings management computing device in communication with a memory device, said method comprising:

receiving, by the savings management computing device from a payment processing network, a transaction data message associated with the payment account transaction initiated by the accountholder at the merchant device, the transaction data message including a savings amount;

identifying, by the savings management computing device, the savings amount from the transaction data message generated by the merchant device;

electronically generating, by the savings management computing device, a savings account ID;

generating an account creation request message by the savings management computing device, the account creation request message including the generated savings account ID, the account creation request message configured to cause the issuing bank computing device to create a savings account at the issuing bank with the savings account ID assigned thereto; and transmitting the account creation request message and the savings amount to the issuing bank computing device for creating the savings account and recording as a savings accrual for the accountholder the savings amount within the savings account.

2. The method of claim 1, wherein receiving a transaction data message further comprises receiving a transaction data message that includes the savings amount and a purchase amount corresponding to the purchase made by the accountholder.

3. The method of claim 1 further comprising:
recording, in the memory device, the savings amount;
generating a total savings amount from a plurality of savings amounts; and
transmitting the total savings amount to the issuing bank computing device.

4. The method of claim 1, wherein receiving a transaction data message further comprises receiving a transaction data message from a merchant bank, wherein the transaction data message further includes a first code associated with a purchase amount and a second code associated with the savings amount, wherein the first code is different than the second code.

5. The method of claim 1 further comprising:
determining that the payment account does not have an associated savings account at the issuing bank; and generating the savings account ID based on the determination that the payment account does not have an associated savings account at the issuing bank.

6. The method of claim 1, further comprising associating the savings account ID with the payment account.

7. The method of claim 1, wherein the savings amount is entered by the accountholder at the merchant device.

8. The method of claim 1, wherein the payment account is a payment card account.

9. The method of claim 1, wherein the merchant device is a point of sale (POS) device.

10. The method of claim 1, wherein the payment account transaction is an online purchase transaction.

11. A savings management computing device for managing consumer savings initiated by a payment account transaction for a purchase made by an accountholder at a merchant device using a payment account, said savings management computing device comprising a processor communicatively coupled to a memory device, said savings management computing device in communication with an issuing bank computing device, said savings management computing device programmed to:
receive, from a payment processing network, a transaction data message associated with the payment account transaction initiated by the accountholder at the merchant device, the transaction data message including a savings amount;
identify the savings amount from the transaction data message generated by the merchant device;
electronically generate a savings account ID;
generate an account creation request message by the savings management computing device, the account creation request message including the generated savings account ID, the account creation request message configured to cause the issuing bank computing device to create a savings account at the issuing bank with the savings account ID assigned thereto; and
transmit the account creation request message and the savings amount to the issuing bank computing device for creating the savings account and recording as a savings accrual for the accountholder the savings amount within the savings account.

12. The savings management computing device of claim 11, wherein to receive a transaction data message, said savings management computing device is programmed to receive a transaction data message that includes the savings amount and a purchase amount corresponding to the purchase made by the accountholder.

13. The savings management computing device of claim 11, wherein said savings management computing device is further programmed to:
record, in the memory device, the savings amount;
generate a total savings amount from a plurality of savings amounts; and
transmit the total savings amount to the issuing bank computing device.

14. The savings management computing device of claim 11, wherein to receive a transaction data message, said savings management computing device is programmed to receive a transaction data message from a merchant bank, wherein the transaction data message further includes a first code associated with a purchase amount and a second code associated with the savings amount, wherein the first code is different than the second code.

15. The savings management computing device of claim 11, wherein wherein the savings amount is entered by the accountholder at the merchant device.

16. The savings management computing device of claim 11, wherein said savings management computing device is further programmed to:
determine that the payment account does not have an associated savings account at the issuing bank; and
generate the savings account ID based on the determination that the payment account does not have an associated savings account at the issuing bank.

17. The savings management computing device of claim 11, wherein the savings amount is entered by the accountholder at the merchant device.

18. A computer-implemented method for managing consumer savings initiated by a payment account transaction for a purchase made by an accountholder at a merchant device using a payment account, the method using a savings management computing device in communication with an issuing bank computing device, the sayings management computing device in communication with a memory device, said method comprising:
receiving, by the savings management computing device from a payment processing network, a transaction data message associated with the payment account transaction initiated by the accountholder at the merchant device;
determining, based on the transaction data message, that a savings account has been established, the savings account associated with the payment account of the accountholder;
causing the merchant device to prompt the accountholder for a savings amount that the accountholder would like to save in the savings account;
receiving the savings amount from the merchant device; and
transmitting the savings amount and a savings account ID to the issuing bank computing device for recording as a savings accrual in the savings account.

19. The method of claim 18, wherein the merchant device is a point of sale (POS) device.

20. The method of claim 18, wherein the payment account is a payment card account.

* * * * *